United States Patent [19]

Needham

[11] 4,025,582

[45] May 24, 1977

[54] ULTRAVIOLET-STABILIZED POLYOLEFIN COMPOSITIONS

[75] Inventor: Donald G. Needham, Bartlesville, Okla.

[73] Assignee: Phillips Petroleum Company, Bartlesville, Okla.

[22] Filed: July 3, 1975

[21] Appl. No.: 593,140

[52] U.S. Cl. .................... 260/897 R; 260/45.7 S; 260/45.95 C
[51] Int. Cl.² ................. C08L 23/06; C08L 23/08
[58] Field of Search ................ 260/897, 79.1

[56] References Cited

UNITED STATES PATENTS

| | | | |
|---|---|---|---|
| 3,392,141 | 7/1968 | Blumberg et al. | 260/45.7 |
| 3,396,110 | 8/1968 | Hill et al. | 252/42.1 |
| 3,432,468 | 3/1969 | Gabler | 260/47 |
| 3,630,900 | 12/1971 | van der Voort | 252/47.5 |
| 3,752,865 | 8/1973 | Scardiglia et al. | 260/848 |
| 3,803,268 | 4/1974 | Brindell et al. | 260/897 R |

*Primary Examiner*—Carman J. Seccuro

[57] ABSTRACT

Addition of poly(phenylene sulfide) to a polyolefin provides an ultraviolet-stabilized composition.

9 Claims, No Drawings

ULTRAVIOLET-STABILIZED POLYOLEFIN COMPOSITIONS

This invention relates to UV-stabilized polyolefin compositions.

BACKGROUND OF THE INVENTION

It is well known that polyolefins deteriorate rather rapidly when exposed to ultraviolet light. Therefore, it is common practice to blend the polyolefins with a UV stabilizer in order to maintain their mechanical properties also under extended ultraviolet irradiation. These UV stabilizers are generally used in relatively small quantities; however, they are quite expensive and constitute a considerable portion of the price of the polyolefin composition. In addition to the high price, the usually employed ultraviolet stabilizers may have detrimental side effects on the mechanical properties of the polyolefin and may create odor and discoloration thereof.

THE INVENTION

It is thus one object of this invention to provide an ultraviolet-stabilized polyolefin composition.

Another object of this invention is to provide a new ultraviolet stabilizer for polyolefins.

A still further object of this invention is to provide an ultraviolet-stabilized polyolefin composition having high tensile strength and good elongation.

Still another object of this invention is to provide an ultraviolet stabilizer for polyolefins which has very low odor level and causes little or no discoloration of the polyolefin resin to which it is admixed.

These and other objects, embodiments, aspects, features, tures and advantages of this invention will become apparent to those skilled in the art from the following detailed description of the invention as well as from the appended claims.

In accordance with this invention, I have now found that the addition of poly(phenylene sulfide) to a polyolefin resin stabilizes this resin against detrimental effects of ultraviolet irradiation while maintaining or even improving the mechanical properties of the polyolefin resin alone when exposed to ultraviolet radiation. In addition, the poly(phenylene sulfide) does not result in any significant discoloration thereof.

More specifically, I have found that a mixture of a polyolefin, being a homopolymer or a copolymer of one or more 1-olefins having 2 to 8 carbon atoms per molecule having added thereto a poly(phenylene sulfide), essentially retains its tensile strength and elongation when exposed to ultraviolet radiation for a long period of time. A UV-stabilizing amount of poly(phenylene sulfide) is added to the polyolefin. This means that a quantity of poly(phenylene sulfide) is added to the polyolefin which is sufficient to essentially maintain the mechanical properties of the mixture over a long period of irradiation with ultraviolet light.

In accordance with a presently preferred embodiment of this invention, there is provided a polymeric composition comprised of about 1 to about 10 parts by weight of poly(phenylene sulfide) and about 99 to about 90 parts by weight of a polyolefin. This range defines the preferred composition. The weight percentages can vary considerably depending upon such factors as desired physical properties and compatibility limits of the polymers.

The preferred group of polyolefins useful in accordance with this invention are those polymers of at least one 1-olefin having from 2 to 8 carbon atoms per molecule. Examples for those olefins are ethylene, propylene, butene-1, pentene-1, hexene-1, heptene-1, octene-1, 4-methylpentene-1, 4-ethylpentene-1, 4-methylhexene-1, 5-methylhexene-1, 4,5-dimethylhexene-1, and 4,5,6-trimethylpentene-1. Among the polyolefins defined the polymers of straight-chained 1-olefins are the preferred group. Particularly preferred are homopolymers of ethylene and copolymers of ethylene with butene-1- and hexene-1. The polyethylenes can be low, medium or high density polyethylene.

The poly(phenylene sulfide) useful in accordance with this invention is a commercially available resin material. The poly(phenylene sulfide) resins as well as methods to make these resins are described in U.S. Pat. No. 3,396,110. One presently preferred resin is the poly(phenylene sulfide which is made by reacting p-dichlorobenzene with a mixture containing sodium sulfide and N-methylpyrrolidone.

The poly(phenylene sulfides) useful in accordance with this invention preferably have a melt flow when tested in accordance with ASTM D-1238-70 at 650° F. (343° C.) using a 5 kg weight of 1 to above about 2500 g/10 minutes (limit of instrument). The inherent viscosity of the poly(phenylene sulfide) is in the range of 0.1 to 0.3, preferably 0.13–0.23, as measured in chloronaphthalene at 206° C. Poly(phenylene sulfides) can be used, however, which have a lower melt flow.

In accordance with a presently preferred embodiment of this invention, there is provided a polymer composition consisting essentially of a polyolefin and a poly(phenylene sulfide), wherein the poly(phenylene sulfide) particles are solid particles being dispersed in a continuous solid phase of polyolefin. The preferred particle size of these poly(phenylene sulfide) particles is such that 90% pass through a 325 mesh screen.

The polyolefin and the poly(phenylene sulfide) can be blended together in any convenient manner. For instance, the two resins can be introduced as comminuted resins into a high-speed blender. Another possibility is to introduce the polyolefin in pellet form and the poly(phenylene sulfide) as the direct process product from the poly(phenylene sulfide) reactor without pelleting into a tumble blender. The particle size of the poly(phenylene sulfide) coming from the poly(phenylene sulfide) reactor is such that about 90 weight percent of the poly(phenylene sulfide) produced passes through a 325 mesh screen. Another blending method is to introduce the finely comminuted poly(phenylene sulfide) into a screw extruder which coextrudes the molten polyolefin and disperses the poly(phenylene sulfide) in the polyolefin.

In accordance with another embodiment of this invention, there is provided a UV-stabilizing agent for polyolefins which comprises particulate poly(phenylene sulfide). This particulate and preferably finely divided poly(phenylene sulfide) has a particle size distribution such that it would pass completely through a sieve of about 100 to about 200 mesh, more preferably still through a 325 mesh screen. This UV-stabilizing agent can be used alone or in addition to other UV-stabilizing agents in the polyolefin.

The invention will be more fully understood by those skilled in the art from the following examples, which are intended to illustrate preferred embodiments of this invention but should not unduly limit the scope thereof.

EXAMPLE I

Into a dry tumble-blending unit a commerically available ethylenebutene-1 copolymer, containing about 5 mol % butene-1 monomers, was introduced in the quantity shown in the following table. The density of this polyolefin determined in accordance with ASTM D-1505-68 was 0.950. The melt index of the polyolefin determined in accordance with ASTM D-1238-70 (Condition E) was 1.2 g/10 minutes. The polyolefin used also contained 0.05 weight percent of Irganox 1010 (tetrakis [3-(3,5-ditertbutyl-4-hydroxyphenyl)-propionyloxymethyl]-methane), 0.075 weight percent of dilaurylthiodipropionate as an antioxident and 0.6 weight percent of UV 531 (2-hydroxy-4-n-octoxybenzophenone) as a UV stabilizer.

The poly(phenylene sulfide) used in this and subsequent examples was prepared according to Example I, U.S. Pat. No. 3,396,110. The resin is supplied by Phillips Petroleum Company under the tradmark Ryton V-1. It has a melt flow (ASTM D-1238-70 at 343° C., 5 kg wt.) in excess of 2500 g/10 min. (limit of instrument). Ninety percent of the particles will pass through a 325 mesh screen (Standard U.S. Sieve Series). The melting point of this resin is about 550° F.

Test bars were compression-molded from each blend. These bars were exposed to UV irradiation in a weatherometer testing facility. After the exposure time shown in the following table, the tensile strength and the elongation of these bars were measured in accordance with ASTM D-638-72. The results of these tests are shown in the following Table I.

TABLE I

| Polyolefin (pbw)[1] | 100 | 99 | 97 | 95 | 90 |
|---|---|---|---|---|---|
| Poly phenylene sulfide) (pbw) | 0 | 1 | 3 | 5 | 10 |
| Hours of Exposure | Tensile Strength psi | Tensile Strength psi | Tensile Strength psi | Tensile Strength psi | Tensile Strength psi |
| 0 | 3750 | 3750 | 3600 | 3600 | 3500 |
| 3000 | 3800 | 3900 | 3800 | 3650 | 3700 |
| 5000 | 1450 | 3325 | 3900 | 3825 | 3800 |
| Hours of Exposure | Elong. % | Elong. % | Elong. % | Elong. % | Elong. % |
| 0 | 48 | 28 | 15 | 12 | 15 |
| 3000 | 20 | 11 | 16 | 13 | 20 |
| 5000 | 5 | 9 | 10 | 10 | 10 | pbw - parts by weight.
[1] Marlex 5012R, Phillips Petroleum Company, Bartlesville, Oklahoma.

The results in the above shown table demonstrate that even after 5000 hours of exposure to UV radiation, both the tensile strength and the elongation of the polymer blends containing poly(phenylene sulfide) were superior to the results achieved with the polyolefin containing 0.6 weight percent of standard UV stabilizer alone. An actual increase of the tensile strength after exposure to UV light was found in those samples containing more than 1 weight percent of poly(phenylene sulfide). Whereas the original elongation of the blend before exposing the samples to the UV irradiation was reduced by the incorporation of poly(phenylene sulfide), no sharp losses in elongation occurred when the poly(phenylene sulfide)-containing samples were exposed to long periods of UV radiation. Generally, a level of elongation of about 9 or 10 percent after 5000 hours of irradiation with UV light is acceptable.

EXAMPLE II

Example I was essentially repeated. However, the polyolefin used in this example did not contain any other UV stabilizer except the added poly(phenylene sulfide). The tests carried out with the compression-molded samples were the same as in Example I. In addition, the melt index of the blends was measured in accordance with ASTM D-1238-70, Condition E. The results are shown in the following Table II.

TABLE II

| Polyolefin (pbw) | 100 | 99 | 97 | 95 | 90 |
|---|---|---|---|---|---|
| Poly (phenylene sulfide) (pbw) | 0 | 1 | 3 | 5 | 10 |
| Hours of Exposure | Tensile Strength psi | Tensile Strength psi | Tensile Strength psi | Tensile Strength psi | Tensile Strength psi |
| 0 | 4175 | 4075 | 4075 | 3925 | 3850 |
| 2000 | 1000 | 3450 | 4275 | 4250 | 4000 |
| Hours of Exposure | MF | MF | MF | MF | MF |
| 0 | 1.3 | 1.3 | 1.2 | 1.1 | 0.96 |
| 2000 | — | — | — | — | — |
| Hours of Exposure | Elong. % | Elong. % | Elong. % | Elong. % | Elong. % |
| 0 | 50 | 26 | 25 | 24 | 11 |
| 2000 | 1 | 9 | 10 | 10 | 10 | pbw = parts by weight.
MF = Melt Index, g/10 min.

The figures of the above shown table indicate that the poly(phenylene sulfide) dramatically improves the stability toward ultraviolet radiation of the polyolefin. The results of the melt index measurement shown in the above table indicate that the blending of the poly(phenylene sulfide) has little or no change on the melt index and thus on the processability of the blends as compared to the processability of the polyolefin itself. The blend was still readily processable with conventional equipment even with as much as 10 weight percent poly(phenylene sulfide).

Reasonable variations and modifications which will be apparent to those skilled in the art can be made in this invention without departing from the spirit and scope thereof.

I claim:

1. A polymer composition being UV-stabilized consisting essentially of a mixture of
   a. a polyolefin selected from the group consisting of homopolymers and copolymers of one or more 1-olefins having 2 to 8 carbon atoms per molecule, and
   b. a stabilizing amount of poly(phenylene sulfide).

2. A composition in accordance with claim 1 wherein the polyolefin is selected from the group consisting of polyethylene, polypropylene, copolymers of ethyelene and butene-1 and mixtures thereof.

3. A composition in accordance with claim 1 wherein said mixture contains particles of poly(phenylene sulfide) dispersed in a continuous phase of polyolefin.

4. A composition in accordance with claim 4 wherein the particle size of the solid poly(phenylene sulfide) particles is such that all the particles pass through a sieve of about 100 to about 200 mesh (U.S. Sieve).

5. A composition in accordance with claim 1 wherein the mixture contains about 1 to about 10 parts by weight of poly(phenylene sulfide) and about 99 to about 90 parts by weight of polyolefin.

6. A composition in accordance with claim 1 wherein the mixture contains at least one additive selected from the group consisting of antioxidants, dyes, pigments, processing aids, fillers and flame retardants.

7. A composition in accordance with claim 1 containing a hindered phenol type UV-stabilizer in addition to the poly(phenylene sulfide).

8. A method for stabilizing polyolefins which comprises admixting to the polyolefin a UV-stabilizing amount of poly(phenylene sulfide).

9. A method in accordance with claim 8 wherein poly(phenylene sulfide) particles having the size so they pass through a sieve of about 100 to about 200 mesh (U.S. Sieve) are admixed to the polyolefin.

* * * * *